(12) United States Patent
Lawrence et al.

(10) Patent No.: US 10,425,312 B1
(45) Date of Patent: Sep. 24, 2019

(54) ONE-CLICK MONITORING

(71) Applicants: Andrew R. Lawrence, Fort Collins, CO (US); Hugh-John E. Flemming, Fort Collins, CO (US); David L. Ashley, Loveland, CO (US)

(72) Inventors: Andrew R. Lawrence, Fort Collins, CO (US); Hugh-John E. Flemming, Fort Collins, CO (US); David L. Ashley, Loveland, CO (US)

(73) Assignee: CA, Inc., New York, NY (US)

( * ) Notice: Subject to any disclaimer, the term of this patent is extended or adjusted under 35 U.S.C. 154(b) by 164 days.

(21) Appl. No.: 14/103,328

(22) Filed: Dec. 11, 2013

(51) Int. Cl.
*H04L 12/26* (2006.01)

(52) U.S. Cl.
CPC ................. *H04L 43/0876* (2013.01)

(58) Field of Classification Search
CPC ............... G06F 11/3093; H04L 67/025; H04L 41/0843; H04L 43/0876
USPC ........................................................ 709/224
See application file for complete search history.

(56) References Cited

U.S. PATENT DOCUMENTS

| | | | |
|---|---|---|---|
| 6,182,136 B1 | 1/2001 | Ramanathan et al. | |
| 6,414,594 B1* | 7/2002 | Guerlain | G05B 23/027 340/506 |
| 6,510,454 B1* | 1/2003 | Walukiewicz | H04L 12/5875 709/200 |
| 7,979,245 B1 | 7/2011 | Bourlatchkov et al. | |
| 8,041,799 B1 | 10/2011 | Usery et al. | |
| 9,009,185 B2 | 4/2015 | Bakalov | |
| 9,118,538 B1* | 8/2015 | Lekkalapudi | H04L 43/00 |
| 9,529,344 B1* | 12/2016 | Hagins | G05B 15/02 |
| 2002/0049838 A1 | 4/2002 | Sylor et al. | |
| 2002/0184360 A1* | 12/2002 | Weber et al. | 709/223 |
| 2003/0154271 A1 | 8/2003 | Baldwin et al. | |
| 2003/0212769 A1* | 11/2003 | Chaudhry | G06Q 10/087 709/220 |
| 2009/0063672 A1* | 3/2009 | Kaminsky et al. | 709/224 |
| 2012/0123991 A1 | 5/2012 | Arndt et al. | |
| 2012/0173717 A1* | 7/2012 | Kohli | 709/224 |
| 2012/0174093 A1* | 7/2012 | Davila | G06F 8/61 717/178 |
| 2012/0297059 A1* | 11/2012 | Bross | 709/224 |
| 2013/0265910 A1* | 10/2013 | Hillen | H04L 41/0806 370/255 |
| 2013/0283175 A1 | 10/2013 | Faridian et al. | |

(Continued)

FOREIGN PATENT DOCUMENTS

WO    WO 2014/021834    *   7/2012    ............. G06F 15/16

OTHER PUBLICATIONS

U.S. Appl. No. 14/103,122, filed Dec. 11, 2013.

(Continued)

*Primary Examiner* — James E Springer
(74) *Attorney, Agent, or Firm* — Baker Botts L.L.P.

(57) ABSTRACT

In accordance with the teachings of the present disclosure, a method of generating a computer alarm is disclosed. The method includes determining a new instance of a characteristic of an element of a computing network to be monitored, identifying a relationship of the element to other elements of the computing network, and automatically creating an alarm threshold for the new instance of the characteristic based upon the relationship of the element to the other elements of the computing network.

14 Claims, 5 Drawing Sheets

(56) References Cited

U.S. PATENT DOCUMENTS

| | | |
|---|---|---|
| 2013/0311645 A1* | 11/2013 | Nagami et al. ............... 709/224 |
| 2014/0282938 A1* | 9/2014 | Moisa ............................... 726/6 |
| 2015/0106504 A1* | 4/2015 | Astigarraga et al. ......... 709/224 |
| 2015/0201237 A1* | 7/2015 | Seiden ............. H04N 21/44218 725/12 |
| 2017/0314961 A1* | 11/2017 | Chen ........................ G01D 3/08 |

OTHER PUBLICATIONS

United States Patent and Trademark Office, Non-Final Office Action issued in related U.S. Appl. No. 14/103,122, dated Sep. 29, 2015, 15 pages.

United States Patent and Trademark Office, Office Action issued in related U.S. Appl. No. 14/103,122 dated Mar. 14, 2016.

United States Patent and Trademark Office, Office Action issued in related U.S. Appl. No. 14/103,122 dated Aug. 25, 2016.

United States Patent and Trademark Office, Office Action issued in related U.S. Appl. No. 14/103,122 dated Mar. 23, 2017.

United States Patent and Trademark Office, Notice of Allowance issued in related U.S. Appl. No. 14/103,122 dated Sep. 14, 2017.

United States Patent and Trademark Office, Corrected Notice of Allowability issued in related U.S. Appl. No. 14/103,122 dated Oct. 18, 2017.

\* cited by examiner

ONE-CLICK MONITORING

BACKGROUND

The present disclosure relates generally to information services infrastructure and network management, and more specifically, to one-click monitoring of elements of a computer system. Computer systems may include many elements communicatively coupled to one another via a network. Network and system administrators may manage network elements using various software tools, which may include a graphical user interface (GUI).

Application code runs on computer systems. One application may have code running on various elements of a computer system. The application itself may be managed by network or system administrators using various software tools which measure various monitored characteristics of the application itself, as well as the various elements of the computer system on which the application is running.

Traditional graphical user interfaces for software tools used by network and system administrators to monitor elements of a computer system may display data related to various monitored characteristics of the elements. The data related to the monitored characteristics may be displayed in the form of metrics, each of which may represent a measure of a particular monitored characteristic.

BRIEF SUMMARY

According to one aspect of the present disclosure, a method of monitoring a computer system is disclosed. The method includes determining a resource to be added to a computing network. The resource is shared among elements of the computing network. The method further includes identifying a classification of the type of resource. Additionally, the method includes, based upon the classification and adding the resource to the computing network, launching a monitor configured to evaluate usage of the resource.

According to another aspect of the present disclosure, a computer-readable storage medium, comprising computer-executable instructions carried on the computer readable medium is disclosed. The instructions are readable by a processor and, when read and executed, are configured to cause the processor to determine a resource to be added to a computing network. The resource is shared among elements of the computing network. The instructions are also configured to, when read and executed, cause the processor to identify a classification of the type of resource. The instructions are also configured to, when read and executed, cause the processor to launch a monitor configured to evaluate usage of the resource. Launching the monitor is based upon the classification and adding the resource to the computing network.

According to yet another aspect of the present disclosure, an apparatus for generating an alarm for a computer system is disclosed. The apparatus includes a processor and a memory communicatively coupled to the processor. The memory includes instructions operable, when read and executed, are configured to cause the processor to determine a resource to be added to a computing network. The resource is shared among elements of the computing network. The instructions are also configured to, when read and executed, cause the processor to identify a classification of the type of resource. The instructions are also configured to, when read and executed, cause the processor to launch a monitor configured to evaluate usage of the resource. Launching the monitor is based upon the classification and adding the resource to the computing network.

BRIEF DESCRIPTION OF THE DRAWINGS

For a more complete understanding of the configurations of the present disclosure, needs satisfied thereby, and the objects, features, and advantages thereof, reference now is made to the following description taken in connection with the accompanying drawings.

DETAILED DESCRIPTION

Figure 1:
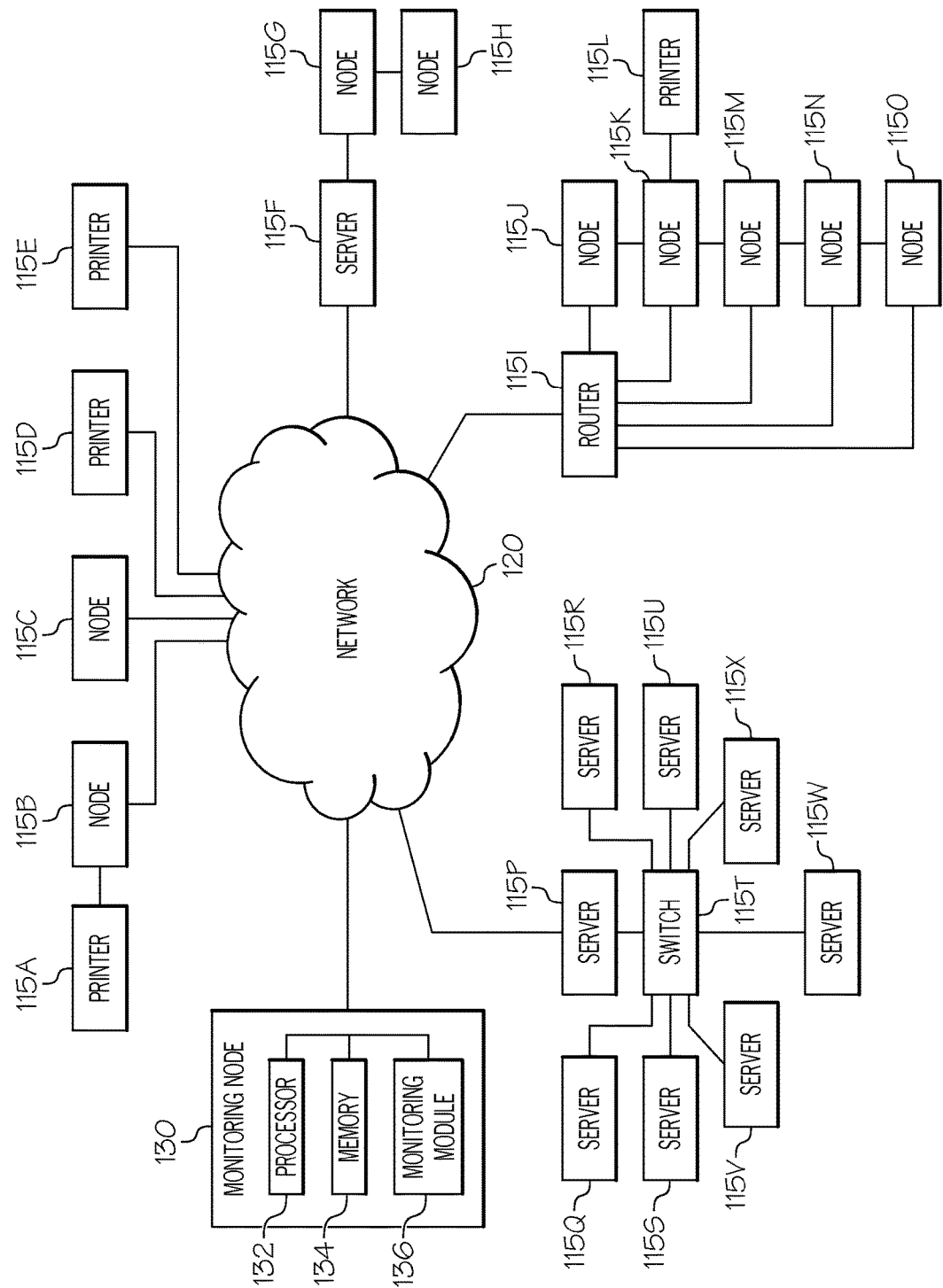
FIG. 1 is a block diagram of an example computer system, in accordance with the teachings of the present disclosure.

As will be appreciated by one skilled in the art, aspects of the present disclosure may be illustrated and described herein in any of a number of patentable classes or context including any new and useful process, machine, manufacture, or composition of matter, or any new and useful improvement thereof. Accordingly, aspects of the present disclosure may be implemented entirely hardware, entirely software (including firmware, resident software, microcode, etc.) or combining software and hardware implementation that may all generally be referred to herein as a "circuit," "element," "module," "component," or "system." Furthermore, aspects of the present disclosure may take the form of a computer program product embodied in one or more computer readable media having computer readable program code embodied thereon.

Any combination of one or more computer readable media may be utilized. The computer readable media may be a computer readable signal medium or a computer readable storage medium. A computer readable storage medium may be, for example, but not limited to, an electronic, magnetic, optical, electromagnetic, or semiconductor system, apparatus, or device, or any suitable combination of the foregoing. More specific examples (a non-exhaustive list) of the computer readable storage medium would include the following: a portable computer diskette, a hard disk, a random access memory (RAM), a read-only memory (ROM), an erasable programmable read-only memory (EPROM or Flash memory), an appropriate optical fiber with a repeater, a portable compact disc read-only memory (CD-ROM), a digital versatile disk (DVD), an optical storage device, a magnetic storage device, or any suitable combination of the foregoing. In the context of this document, a computer readable storage medium may be any tangible medium that can contain, or store a program for use by or in connection with an instruction execution system, apparatus, or device.

A computer readable signal medium may include a propagated data signal with computer readable program code embodied therein, for example, in baseband or as part of a carrier wave. Such a propagated signal may take any of a variety of forms, including, but not limited to, electromagnetic, optical, or any suitable combination thereof. A computer readable signal medium may be any computer readable medium that is not a computer readable storage medium and that can communicate, propagate, or transport a program for use by or in connection with an instruction execution system, apparatus, or device. Program code embodied on a computer readable signal medium may be transmitted using any appropriate medium, including but not limited to wireless, wireline, optical fiber cable, RF, etc., or any suitable combination of the foregoing.

Computer program code for carrying out operations for aspects of the present disclosure may be written in any combination of one or more programming languages, including an object oriented programming language such as Java, Scala, Smalltalk, Eiffel, JADE, Emerald, C++, C#, VB.NET, Python or the like, conventional procedural programming languages, such as the "C" programming language, Visual Basic, Fortran 2003, Perl, COBOL 2002, PHP, ABAP, dynamic programming languages such as Python, Ruby and Groovy, or other programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider) or in a cloud computing environment or offered as a service such as a Software as a Service (SaaS).

Aspects of the present disclosure are described herein with reference to flowchart illustrations and/or block diagrams of methods, apparatuses (systems) and computer program products according to embodiments of the disclosure. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable instruction execution apparatus, create a mechanism for implementing the functions/acts specified in the flowchart and/or block diagram block or blocks.

The computer program instructions may also be stored in a computer readable medium that when executed can direct a computer, other programmable data processing apparatus, or other devices to function in a particular manner, such that the instructions when stored in the computer readable medium produce an article of manufacture including instructions which when executed, cause a computer to implement the function/act specified in the flowchart and/or block diagram block or blocks. The computer program instructions may also be loaded onto a computer, other programmable instruction execution apparatus, or other devices to cause a series of operational steps to be performed on the computer, other programmable apparatuses or other devices to produce a computer implemented process such that the instructions which execute on the computer or other programmable apparatus provide processes for implementing the functions/acts specified in the flowchart and/or block diagram block or blocks.

In accordance with the teachings of the present disclosure, a system may be provided that is configured to provide one-click monitoring of a network of computing elements. Upon addition of shared resources or elements of the network, monitoring of the network may be automatically enabled. The monitoring may be based upon a template associated with the type of resource or element that is added. The template may specific characteristics of operation that are to be monitored. Particular embodiments and their advantages are best understood by reference to FIGS. 1 through 5, wherein like numbers are used to indicate like and corresponding parts.

FIG. 1 is a block diagram of an example system 100, in accordance with the teachings of the present disclosure. System 100 may include, for example, a plurality of elements 115, a monitoring node 130, and a network 120. Monitoring node 130 may be configured to provide one-click monitoring for elements 115 (and resources thereof) as they are provisioned or added to system 100. Each element 115 may include a physical or logical element communicatively coupled to monitoring node 130 via network 120. For example, each element 115 may include a server (e.g., blade server or rack server), personal computer (e.g., desktop or laptop), tablet computer, mobile device (e.g., personal digital assistant (PDA) or smart phone), network storage device, printer, switch, router, data collection device, virtual machine, script, executable, firmware, library, shared library, function, module, software application, or any other suitable device or application. The components or whole of element 115 may make up a resource. Furthermore, element 115 may include one or more resources, such as a processor, memory, peripheral, application, datastore, storage, function, card, board, or other physical or virtual device. Although example system 100 is shown in FIG. 1 as including a particular number of elements 115, a system may include more than or fewer than the number of elements 115 illustrated. Similarly, although example system 100 is shown in FIG. 1 as including elements 115 of particular types, a system may include elements 115 of types other than those shown in FIG. 1.

Network 120 may include a network and/or fabric configured to communicatively couple elements 115, monitoring node 130, and/or any element associated with system 100. Network 120 may be implemented as, or may be a part of, a storage area network (SAN), personal area network (PAN), local area network (LAN), a metropolitan area network (MAN), a wide area network (WAN), a wireless local area network (WLAN), a virtual private network (VPN), an intranet, the Internet or any other appropriate architecture or system configured to facilitate the communication of signals, data and/or messages (generally referred to as data). Network 120 may transmit data using any storage and/or communication protocol, including without limitation, Fibre Channel, Frame Relay, Asynchronous Transfer Mode (ATM), Internet protocol (IP), other packet-based protocol, small computer system interface (SCSI), Internet SCSI (iSCSI), advanced technology attachment (ATA), serial ATA (SATA), advanced technology attachment packet interface (ATAPI), serial storage architecture (SSA), integrated drive electronics (IDE), and/or any combination thereof. Network 120 and its various components may be implemented using hardware, software, or any combination thereof.

Monitoring node 130 may include a processor 132, a memory 134, and a monitoring module 136. Processor 132 may be communicatively coupled to memory 134 and monitoring module 136. Processor 132 may include any system, device, or apparatus operable to interpret and/or execute program instructions and/or process data, and may include without limitation a microprocessor, a microcontroller, a digital signal processor (DSP), an application specific integrated circuit (ASIC), or any other digital or analog circuitry configured to interpret and/or execute program instructions and/or process data.

Memory 134 may be configured in part or whole as application memory, system memory, or both. Memory 134 may include any system, device, or apparatus configured to hold and/or house one or more memory modules. Each memory module may include any system, device or apparatus configured to retain program instructions and/or data for a period of time (e.g., computer-readable storage media).

Monitoring module 136 may include computer-program instructions resident in memory 134 (or another computer-readable medium communicatively coupled to monitoring node 130) and capable of being executed by processor 132. Monitoring module 136 may be configured to monitor various characteristics of elements 115. Such characteristics may include, but are not limited to, utilization, response time, performance, throughput, transaction count, and other characteristics related to usage and/or performance of elements 115. Monitoring module 136 may be configured to collect data related to various metrics. Each metric may represent a measure of a particular monitored characteristic. Where a single characteristic is referenced, it may be understood that multiple characteristics may be monitored and/or utilized. Data related to a particular metric may include values representing a measure of the particular monitored characteristic. In some embodiments, the data collected by monitoring module 136 may be stored in memory 134. In other embodiments, the data collected by monitoring module 136 may be stored in storage 140.

Storage 140 may include a database, directory, or other data structure operable to store data. Further, storage 140 may include any instrumentality or aggregation of instrumentalities that may retain data and/or instructions for a period of time. Storage 140 may include random access memory (RAM), electrically erasable programmable read-only memory (EEPROM), a Personal Computer Memory Card International Association (PCMCIA) card, flash memory, solid state disks, hard disk drives, magnetic tape libraries, optical disk drives, magneto-optical disk drives, compact disk drives, compact disk arrays, disk array controllers, and/or any suitable selection or array of volatile or non-volatile memory operable to store data.

Monitoring node 130 may be implemented in any suitable portion of system 100. Although monitoring node 130 is illustrated as a node separate from elements 115, in various embodiments monitoring node 130 may be implemented in one of elements 115. Furthermore, in various other embodiments, multiple instances of monitoring node 130 may be implemented in various ones of elements 115.

Monitoring module 136 may be configured to actively and/or passively monitor elements 115 and resources thereof. For example, monitoring module 136 may actively monitor a particular element 115 and resources thereof by querying element 115 for specific information and/or measuring the time it takes element 115 to respond to queries. Monitoring module 136 may passively monitor a particular element 115 and resources thereof by, for example, accessing and analyzing an error log, or other performance related log maintained by an element 115 or another component of system 100. Furthermore, monitoring module 136 may monitor elements 115 and resources thereof by sniffing or evaluating data as it is passed through an instance of monitoring module 136.

Given the addition or creation of a new resource or element in system 100, monitoring module 136 may be configured to create a monitor for the newly added resource or element. A resource or element may be added to system 100 by, for example, a user or administrator of system provisioning the resource or element using an administration tool. Such an administration tool may be implemented in any suitable portion of system 100, such as in monitoring module 136. The administration tool may provide any suitable number or kind of options for operations for adding, provisioning, or otherwise configuring resources or elements for system 100. In another example, a resource or element may be added to system 100 by connecting to networked elements of system 100. In such an example, monitoring module 136 may detect the addition of the resource or element.

A monitor for a newly added resource or element of system 100 may be implemented in any suitable manner. In one embodiment, such a monitor may be added to the functionality of monitoring module 136. In another embodiment, a monitor for a newly added resource or element may be implemented as another instance of monitoring module 136 and executed in any suitable portion of system 100.

The characteristics monitored in a newly created monitor may be defined according to a template. The template may be based on any suitable criteria, such as a classification of the nature of the resource or element or the position of the resource or element in the network. A template may be designed and populated by a user or administrator of system 100.

In one embodiment, monitoring module 136, upon detection of a newly added resource or element of system 100, may be configured to automatically select and apply an appropriate template to the newly added resource or element. The template, as applied to the resource or element, may thus specify how the resource or element is to be monitored. As an administrator or user of system 100 provisions or adds a new element 115 or resources thereof through a GUI, the user's operation to create or provision the new element may consequently and automatically establish monitoring for the new element. Thus, a single click of an option in the GUI, for example, to create or provision the new element may also establish monitoring for the new element, resulting in one-click monitoring of the element.

Monitoring node 130 may be configured to analyze data collected by monitoring module 136 and trigger an alarm if data related to a monitored characteristic of one or more elements 115 or indicates a problem, issue, or condition. The thresholds for the characteristics may be defined by monitoring module 136 and may be applied based on the type of characteristic. Furthermore, the thresholds may be applied automatically to a newly detected or added element 115 or resource thereof. The thresholds may include a default value to be applied automatically. For example, given a newly added element including a datastore at element 115Q, monitoring module 136 may be configured to create a monitor of the datastore of element 115Q and trigger an alarm if usage exceeds 95% for more than an hour.

An alarm may be implemented in any suitable manner. For example, an alarm may be implemented as a notation in a database, record or file; as an electronic communication to a user of system 100 or monitoring module 136; as an electronic communication to another portion of system 100 for handling; or as a visual or audible indicator within a monitoring program. An alarm may be a compound alarm by, for example, inclusion of thresholds for multiple characteristics; thresholds for characteristics on multiple elements; or logical or predicate bases for characteristic thresholds.

An alarm may be based upon any suitable threshold, binary determination, trend, or pattern in data related to a monitored characteristic. For example, an alarm may include thresholds that identify deviations from known safe usage trends and/or patterns. An alarm may be based upon under-utilization or overutilization of a resource, node, element, or service of system 100. Furthermore, an alarm may be based upon determined activity associated with malware or electronic intrusion.

Figure 2:
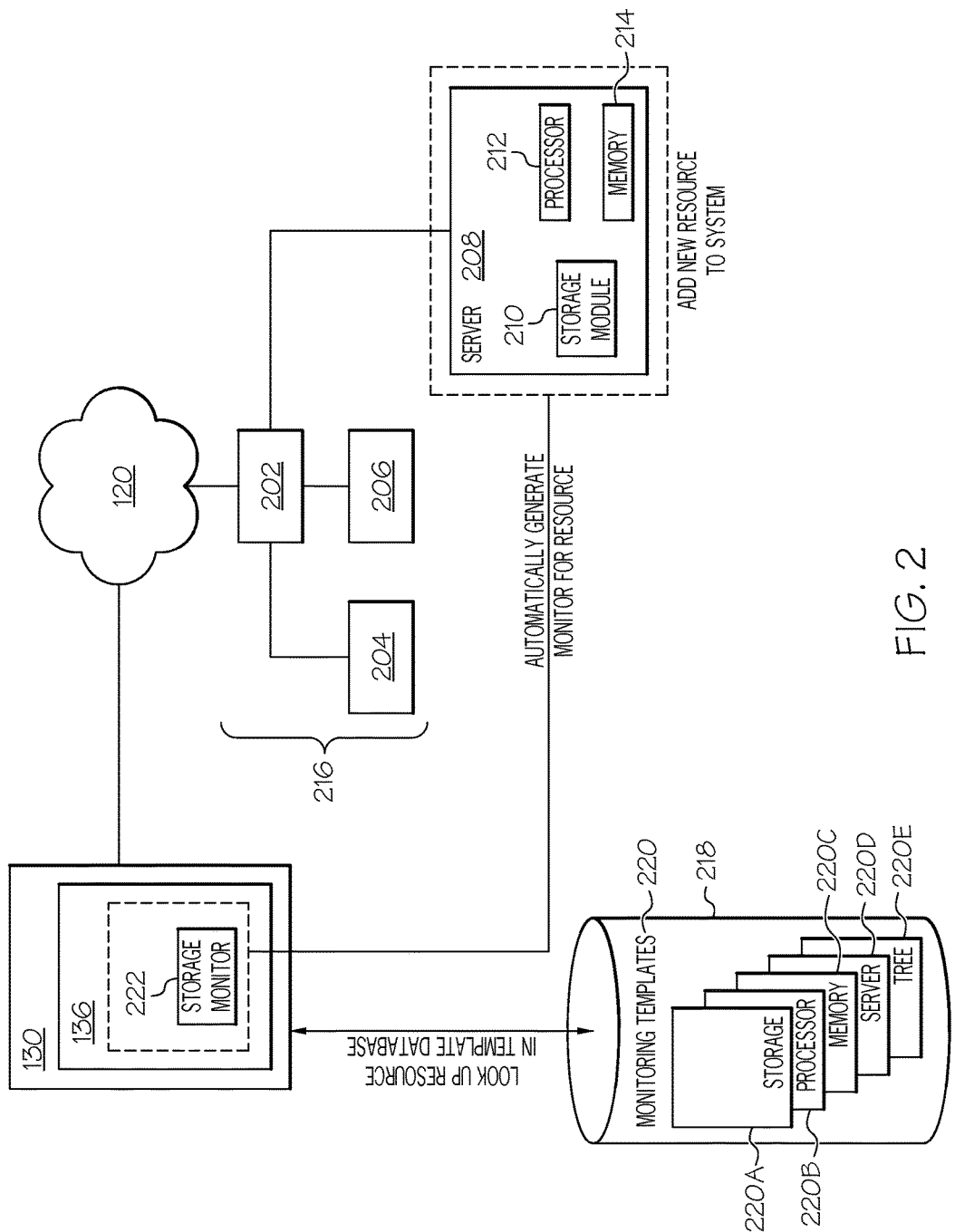
FIG. 2 is an illustration of configuration and operation of a system for performing one-click monitoring, in accordance with the teachings of the present disclosure.

FIG. 2 is an illustration of configuration and operation of system 100 for performing one-click monitoring, in accordance with the teachings of the present disclosure. System 100 may include elements 202, 204, 206 configured in a tree hierarchy 216 with element 202 as the root node. Elements 202, 204, 206 may be implemented by any suitable element such as those illustrated in FIG. 1. Although a particular number and arrangement of elements is illustrated in FIG. 2, any suitable number, combination, arrangement, or topology of elements may be used, such as a loop, ring, bus, star, point-to-point, mesh, or daisy-chain. Such topologies may be physical or virtual. One or more elements may be arranged in a subnetwork, such as subnetwork corresponding to tree hierarchy 216. Accordingly, element 204 may be peers with element 206. Furthermore, element 204 and element 206 may each be child elements of element 202.

In one embodiment, element 208 may be added to system 100. Such an addition may be made, for example, by connecting element 208 to system 100 and booting element 208. Furthermore, the addition may be made by a user or administrator of system 100 adding or provisioning element 208 through monitoring module 136. In a further embodiment, element 208 may be considered as a resource.

In another embodiment, specific resources of element 208 may be added to or provisioned in system 100. Such specific resources may be added by the addition of element 208 itself or by the addition of the specific resources themselves. Any suitable number and kind of resources may be added. For example, element 208 may include a processor, memory, peripheral, application, datastore, storage, function, card, board, or other physical or virtual device. In the example of FIG. 2, element 208 may include a storage module 210 configured to provide datastore services to clients, a processor 212, and a memory 214.

Each element and resource thereof may be associated with one or more monitored characteristics. The characteristics monitored for each of elements 202, 204, 206, 208 may include the same or different characteristics. In one embodiment, all elements of a given topology or connection may share a common group of monitored characteristics. A given topology or connection may establish monitored characteristics by default according to, for example, settings for a topology or by the type of connection. In another embodiment, all elements of a given type may include the same or different characteristics. In the example of FIG. 2, element 208 may be implemented as a defined server type.

Given the addition of a new element or resource thereof, monitoring module 136 may be configured to automatically create a monitor for the added element or resources. For example, given the addition of element 208 monitoring module 136 may be configured to create a monitor to monitor one or more characteristics of element 208. In another example, given the addition of an individual one of storage module 210, processor 212, or memory 214 in element 208, monitoring module 136 may be configured to create a monitor for the individual resource.

As described above, a generated monitor may be implemented in any suitable manner. In the example of FIG. 2, such a monitor may be implemented by a new monitor 222 within monitoring module 136. Monitor 222 may include a parameters, functions, definitions, or another suitable information or instructions configured to cause monitoring module 136 to monitor characteristics of the associated element or resource.

Any suitable mechanism may be used to implement the parameters, functions, definitions, or other information or instructions that determine what aspects or characteristics of an element or resource will be monitored. In one embodiment, one or more monitoring templates 220 may be used by system 100 to determine what aspects or characteristics of an element or resource will be monitored. Monitoring templates 220 may be implemented in any suitable manner, such as by parameters, functions, definitions, instructions, logic, or code, and may be stored in, for example, a database, file, application programming interface, library, shared library, record, data structure, service, software-as-service, or any other suitable mechanism. In the example of FIG. 2, monitoring templates 220 may be stored in template database 218. Template database 218 may be communicatively coupled to monitoring module 136 and may provide a monitoring template 220 in response to a query or call by monitoring module 136.

Any suitable number and kind of monitoring templates 220 may be available for use in system 100. Monitoring templates 220 may match elements or resources according to any suitable criteria. In one embodiment, monitoring templates 220 may include a template for a given specific type of element or resource. For example, monitoring templates 220 may include a template for servers generally, clients generally, storage servers, datastores, printers, routers, switches, back-up servers, thin clients, instances of a particular application, instances of a particular version of an application, machines running a given virtual machine, machines running a given operating system, cloud servers, redundant servers, redundant array of independent disks (RAID), attached drives, file servers, web servers, network security devices, storage area network, attached memory, persistent memory, shared memory pool, read-only memory, flash memory devices, bandwidth, or processing. Given the identity of the added element 208 or resources thereof, monitoring module 136 may query for the most tailored template available.

In another embodiment, monitoring templates 220 may include a template for a given position in a network topology or hierarchy. For example, monitoring templates 220 may include templates for elements within a given peer group of a topology, children of a given element, or membership in a given topology.

Monitoring module 136 may be configured to apply the retrieved template 220 to establish the operation of monitor 222. Once operating, monitor 222 may evaluate the use of the added element or resource. If applicable, an alarm may be triggered based upon such use.

Example operation is illustrated in FIG. 2. At (1), a new resource may be added to system 100. Such a resource may include element 208. Element 208 may be implemented as a server. Furthermore, element 208 may include resources such as a storage module 210, processor 212, and memory 214. The type of server of element 208 may include a storage server, based upon the inclusion of storage module 210. Thus, the addition of element 208 may be considered as an addition of a storage server resource to system 100. The addition of element 208 may be made by connecting element 208 to system 100 and booting element 208. Furthermore, the addition of element 208 may be made by a user of monitoring module 136 adding or provisioning element 208 in monitoring module 136. Such provisioning may be made by, for example, clicking options in a GUI.

At (2), upon addition of element 208, monitoring module 136 may automatically select a template to apply to element 208 for monitoring of characteristics. Monitoring module 136 may access template database 218 to make retrieve an appropriate template. The selection of which of monitoring templates 220 will be used may be made by the mechanism in which element 208 is identified by monitoring module 136. For example, monitoring module 136 may identify element 208 as resident within tree hierarchy 216, and thus retrieve monitoring template 220E. Monitoring module 136 may identify element 208 as a server generally, and thus retrieve monitoring template 220D. Monitoring module 136 may identify element 208 as including a memory resource such as memory 214, and thus retrieve monitoring template 220C. Monitoring module 136 may identify element 208 as including a resource such as processor 212, and thus retrieve monitoring template 220B. Monitoring module 136 may identify element 208 as including a particular application or component such as storage module 210 defining its operation, and thus retrieve monitoring template 220A. In the example of FIG. 2, monitoring module 136 may retrieve monitoring template 220A.

At (3), monitoring module 136 may utilize template 220A to automatically launch monitor 222 for monitoring element 208. The characteristics of element 208 that are to be monitored may be defined by template 220A. Upon launch, monitor 222 may monitor and record these characteristics. If applicable, monitor 222 may provide an alert if resource usage exceeds thresholds. Such thresholds may be defined by default by template 220A.

Figure 3:
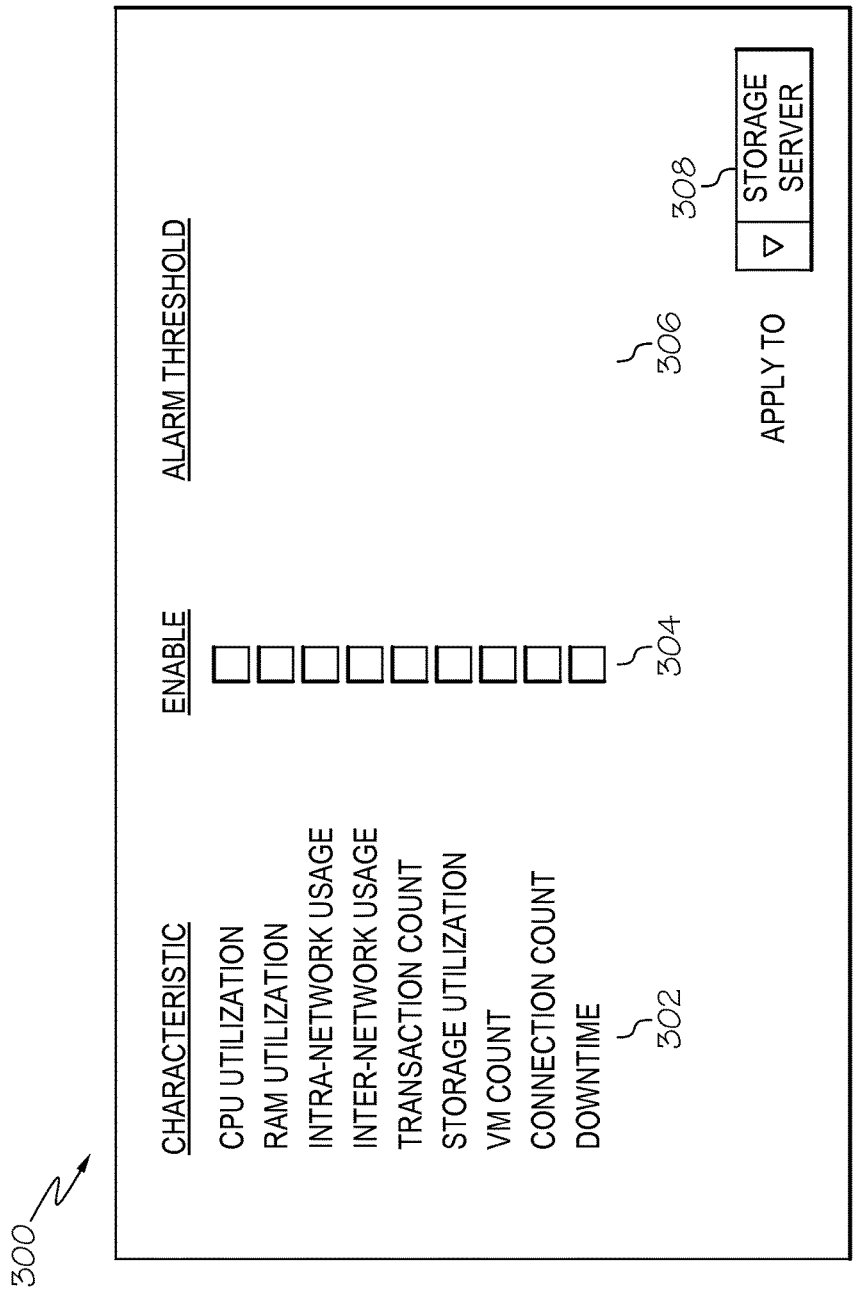
FIG. 3 is an illustration of a graphical user interface for configuring a template for generating a monitor, in accordance with the teachings of the present disclosure.

FIG. 3 is an illustration of a GUI 300 for configuring a template such as template 220 for generating a monitor such as monitor 222, in accordance with the teachings of the present disclosure. GUI 300 may include characteristic options 302. Characteristic options 302 may be provided for any aspect of resource usage or characteristics associated with an element. For example, characteristic options 302 may include processor utilization, memory utilization, bandwidth within a network, bandwidth between networks, network transaction counts, storage utilization, a count of virtual machines, a count of electronic connections, or downtime.

Furthermore, GUI 300 may include enable options 304 for each of characteristic options 302. Enable options 304 may facilitate a user of GUI 300 to select which characteristics will be monitored by a monitor generated using the template.

In addition, GUI 300 may include alarm thresholds 306. Alarm thresholds 306 may be defined in a quantity and metric suitable to an associated characteristic. A user of GUI 300 may specify amounts in alarm thresholds above or below which will generate an alert.

GUI 300 may include a type specifier 308 configured to identify types of elements or resources to which the template will apply. Type specifier 308 may allow a user of GUI 300 to save the template.

Figure 4:
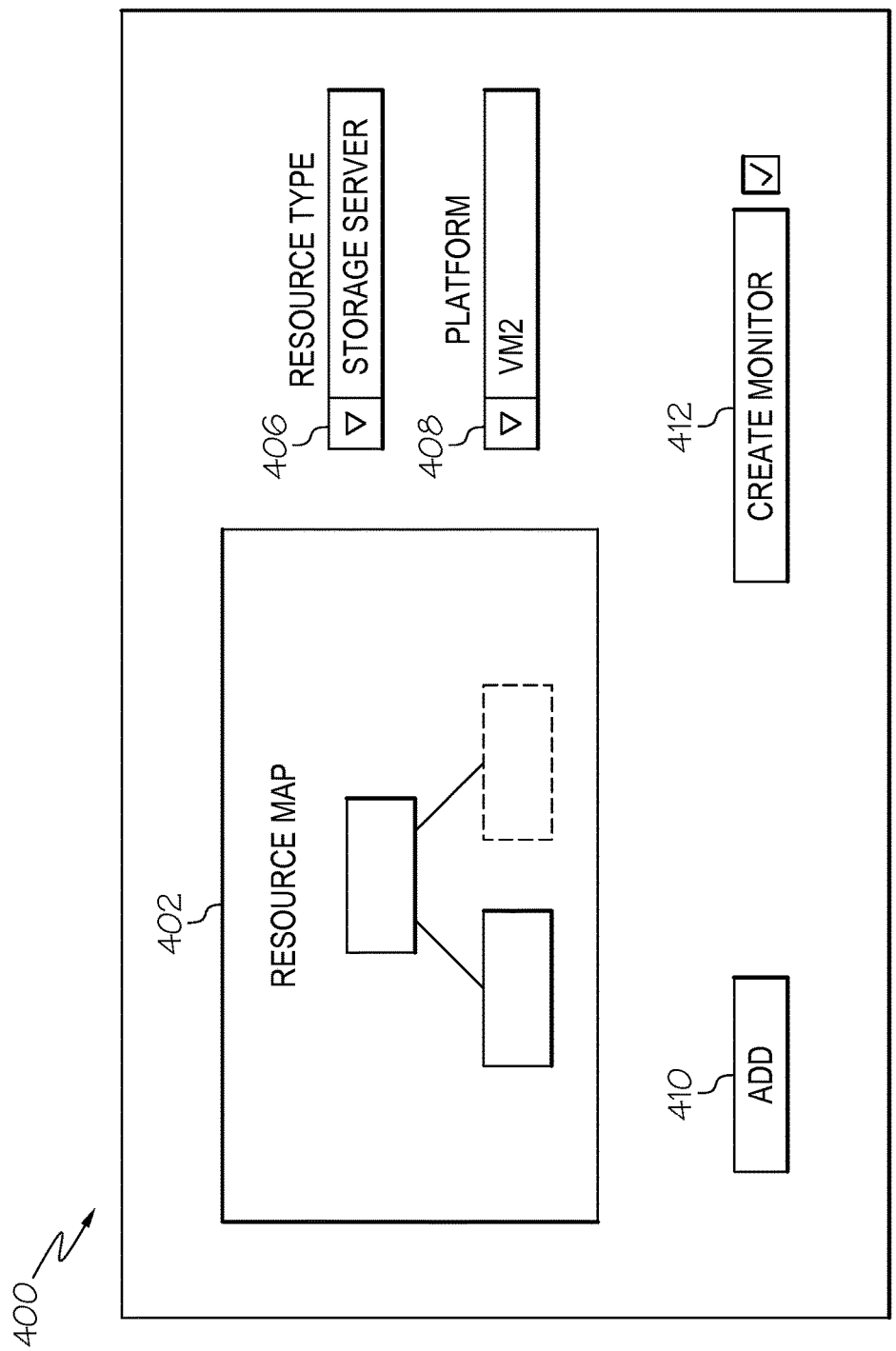
FIG. 4 is an illustration of a graphical user interface for adding or provisioning a resource or an element in a system, in accordance with the teachings of the present disclosure.

FIG. 4 is an illustration of a GUI 400 for adding or provisioning a resource or an element in system 100, in accordance with the teachings of the present disclosure. GUI 400 may include a resource map 402 configured to accept input from a user about what portion of system 100 includes the element or resource. Resource map 402 may include definitions of topologies or relationships with other elements that may be applied to the newly added resource or element.

GUI 400 may include one or more options for specifying the nature of the element or resource to be added. For example, GUI 400 may include a resource type option 406 for specifying what kind of element or resource will be added. In another example, GUI 400 may include a platform option 408 for specifying, for example, the operating system, virtual machine, or other software on which the element or resource will be operating.

GUI 400 may include an option 412 for automatically creating a monitor upon adding the resource or element to system 100. Option 412 may be selected by default. Choosing option 412 may cause monitoring module 136 to, upon adding the resource or element, perform the operations described in FIG. 2, such as looking up a template to apply to the newly added resource or element. A monitor may be generated as a result that will monitor the characteristics specified in the template.

GUI 400 may include an option 410 for adding the resource or element to system 100. Upon selection of option 410, the resource or element may be added to system 100 and, if option 412 is selected, a monitor may be automatically launched for the resource or element. Accordingly, a user selecting option 410 may add the resource or element as well as perform monitoring of the resource or element with a single click or selection.

Figure 5:
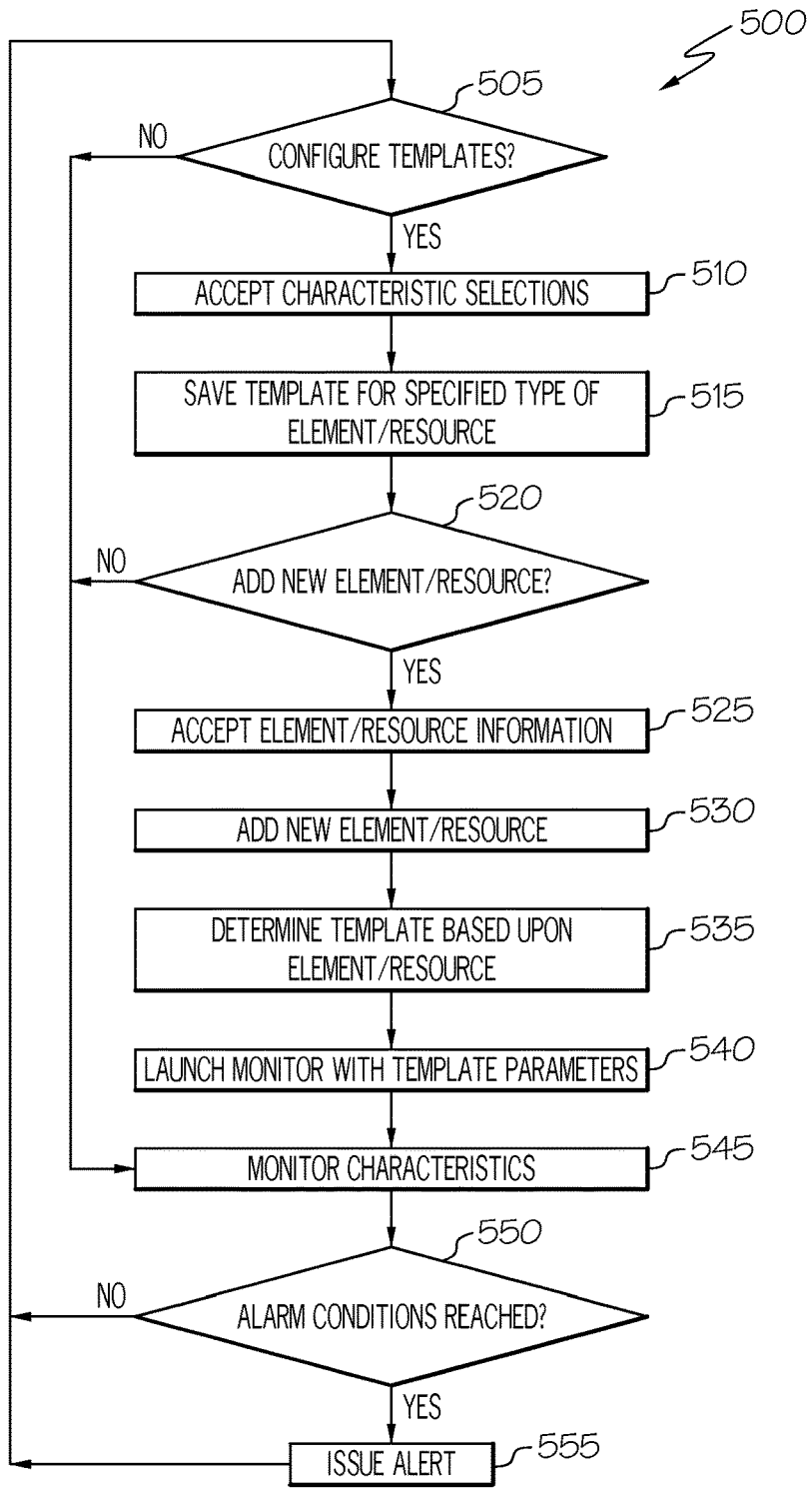
FIG. 5 is a flowchart of an example method for performing one-click monitoring.

FIG. 5 is a flowchart of an example method 500 for performing one-click monitoring, in accordance with the teachings of the present disclosure. Although FIG. 5 discloses a particular number of steps to be taken with respect to example method 500, method 500 may be executed with more or fewer steps than those depicted in FIG. 5. In addition, although FIG. 5 discloses a certain order of steps to be taken with respect to method 500, the steps of these methods may be completed in any suitable order. Method 500 may be implemented using the system of FIGS. 1-4 or any other suitable mechanism. In certain embodiments, method 500 may be implemented partially or fully in software embodied in computer-readable storage media.

Program instructions may be used to cause a general-purpose or special-purpose processing system that is programmed with the instructions to perform the operations described below. The operations may be performed by specific hardware components that contain hardwired logic for performing the operations, or by any combination of programmed computer components and custom hardware components. Method 500 may be provided as a computer program product that may include one or more machine readable media having stored thereon instructions that may be used to program a processing system or other electronic device to perform the methods.

In some embodiments, method 500 may begin at 505. At 505, the monitoring module of a monitoring node (such as shown in FIG. 1) may determine whether a user would like to configure templates for a given type of element or resource. If not, method 500 may proceed to 520. If so, at 510 user input regarding one or more templates may be accepted. Configuration may be performed by, for example, GUI 300 of FIG. 3. Characteristics to be monitored may be recorded, as well as alarm thresholds. The set of characteristics as applied to a type of resource or element may be saved as a template in 515. The type of resource or element may be specified by user input. The template may be saved to any suitable location, At 520, the monitoring node may be determined whether a new element or resource is to be added. Such a determination may be made by, for example, user input as provided by GUI 400 of FIG. 4. If a new element or resource is not going to be added, method 500 may proceed to 545. If a new element or resource will be added, at 525 information about the element or resource may be received. Such information may include where in a system the element or resource will reside, or the type of the element or resource. At 530, the new element or resource may be added to the system. At 535, a template corresponding to the new element or resource may be determined. The template may be determined by, for example, the type of element or resource. At 540, a monitor configured to monitor the characteristics of the element or resource specified in the template may be launched. Such a monitor may be launched as part of the monitoring module.

At 545, the monitoring module may monitor characteristics of designated elements and resources, according to templates previously applied. At 550, it may be determined whether any alarm conditions have been reached. If not, method 500 may terminate or repeat by proceeding to 505. If so, at 555 an alert, such as an audible signal, visual signal, or electronic communication may be sent to a user of the system. Method 500 may terminate or repeat by proceeding to 505.

The flowchart and block diagrams in the figures illustrate the architecture, functionality, and operation of possible implementations of systems, methods and computer program products according to various aspects of the present disclosure. In this regard, each block in the flowchart or block diagrams may represent a module, segment, or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

The terminology used herein is for the purpose of describing particular aspects only and is not intended to be limiting of the disclosure. As used herein, the singular forms "a," "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

The corresponding structures, materials, acts, and equivalents of any means or step plus function elements in the claims below are intended to include any disclosed structure, material, or act for performing the function in combination with other claimed elements as specifically claimed. The description of the present disclosure has been presented for purposes of illustration and description, but is not intended to be exhaustive or limited to the disclosure in the form disclosed. Many modifications and variations will be apparent to those of ordinary skill in the art without departing from the scope and spirit of the disclosure. The aspects of the disclosure herein were chosen and described in order to best explain the principles of the disclosure and the practical application, and to enable others of ordinary skill in the art to understand the disclosure with various modifications as are suited to the particular use contemplated.

What is claimed is:

1. A method of monitoring a computer system, comprising:
    detecting a newly added resource to a computing network, the resource to be shared among elements of the computing network;
    identifying a classification of a type of resource;
    automatically receiving a template for the newly added resource in response to identifying the classification of the type of resource, the template based on the identified classification of the resource; and
    accepting a user input to add the resource to the computing network, wherein the user input comprises a single selection on a graphical user interface (GUI) and in response to the single selection on the GUI;
        launching a monitor, using a processor, configured to monitor characteristics of the resource, wherein the template specifies the characteristics to be monitored and wherein launching the monitor is performed automatically in response to detecting the newly added resource;
        monitoring usage of the resource according to the template, the template defining characteristics of the resource to be monitored and associated with the classification of the type of resource; and
    triggering an alarm to inform a user when threshold values for multiple characteristics of the newly added resource are exceeded,
    wherein the template includes the threshold values, and wherein the threshold values comprise a default value to be applied automatically to the newly added resource.

2. The method of claim 1, wherein the template is used to automatically launch the monitor based upon parameters specified in the template, the template associated with the classification of the type of resource.

3. The method of claim 2, wherein the classification of the type of resource is based upon a platform in which the resource operates.

4. The method of claim 1, further comprising:
    accepting user input defining a usage characteristic associated with the resource; and
    populating the template with parameters defining the usage characteristic;
    wherein the monitor is configured to evaluate usage of the resource using the parameters of the template.

5. The method of claim 1, wherein the multiple criteria comprises thresholds for multiple characteristics or thresholds for characteristics of multiple elements.

6. A non-transitory computer-readable storage medium, comprising computer-executable instructions carried on the computer readable medium, the instructions readable by a processor and, when read and executed, configured to cause the processor to:
    accept a user input to add a resource to a computing network, wherein the user input comprises a single selection on a graphical user interface (GUI);
    detect the newly added resource to the computing network, the resource to be shared among elements of the computing network;
    identify a classification of a type of resource;
    automatically receive a template for the newly added resource in response to identifying the classification of the type of resource, the template based on the identified classification of the resource;

in response to the single selection on the GUI:
launch a monitor configured to evaluate usage of the resource based upon the template;
monitor usage of the resource according to the template, the template defining characteristics of the resource to be monitored and associated with the classification of the type of resource; and
trigger an alarm to inform a user when threshold values for multiple characteristics of the newly added resource are exceeded,
wherein the template includes the threshold values, and wherein the threshold values comprise a default value to be applied automatically to the newly added resource.

7. The medium of claim 6, wherein the monitor is launched based upon parameters specified in a template, the template associated with the classification of the type of resource.

8. The medium of claim 7, wherein the classification of the type of resource is based upon a platform in which the resource operates.

9. The medium of claim 6, further comprising instructions configured to cause the processor to:
accept user input defining a usage characteristic associated with the resource; and
populate a template with parameters defining the usage characteristic;
wherein the monitor is configured to evaluate usage of the resource using the parameters of the template.

10. The medium of claim 6, wherein the template includes the threshold values.

11. An apparatus for monitoring a computer system, the apparatus comprising:
a processor; and
a memory communicatively coupled to the processor, the memory comprising instructions, when executed by the processor, configured to cause the processor to:
detect a newly added resource to a computing network, the resource to be shared among elements of the computing network;
identify a classification of a type of resource;
automatically receive a template for the newly added resource in response to identifying the classification of the type of resource, the template based on the identified classification of the resource and received in response to a query for the template most tailored to the resource;
accept a user input to add a resource to a computing network, wherein the user input comprises a single selection on a graphical user interface (GUI) and in response to the single selection on the GUI:
launch a monitor, using a processor, configured to monitor characteristics of the resource based on the template;
monitor usage of the resource according to the template, the template defining characteristics of the resource to be monitored and associated with the classification of the type of resource; and
trigger an alarm to inform a user when threshold values for multiple characteristics of the newly added resource are exceeded,
wherein the template includes the threshold values, and wherein the threshold values comprise a default value to be applied automatically to the newly added resource.

12. The apparatus of claim 11, wherein the monitor is launched based upon parameters specified in the template, the template associated with the classification of the type of resource.

13. The apparatus of claim 12, wherein the classification of the type of resource is based upon a platform in which the resource operates.

14. The apparatus of claim 11, wherein the memory further comprises instructions configured to cause the processor to:
accept user input defining a usage characteristic associated with the resource; and
populate the template with parameters defining the usage characteristic;
wherein the monitor is configured to evaluate usage of the resource using the parameters of the template.

* * * * *